March 22, 1938.　　R. G. LE TOURNEAU　　2,112,105
TELESCOPING SCRAPER
Filed Nov. 10, 1936　　6 Sheets-Sheet 1

INVENTOR
R.G. LeTourneau
ATTORNEY

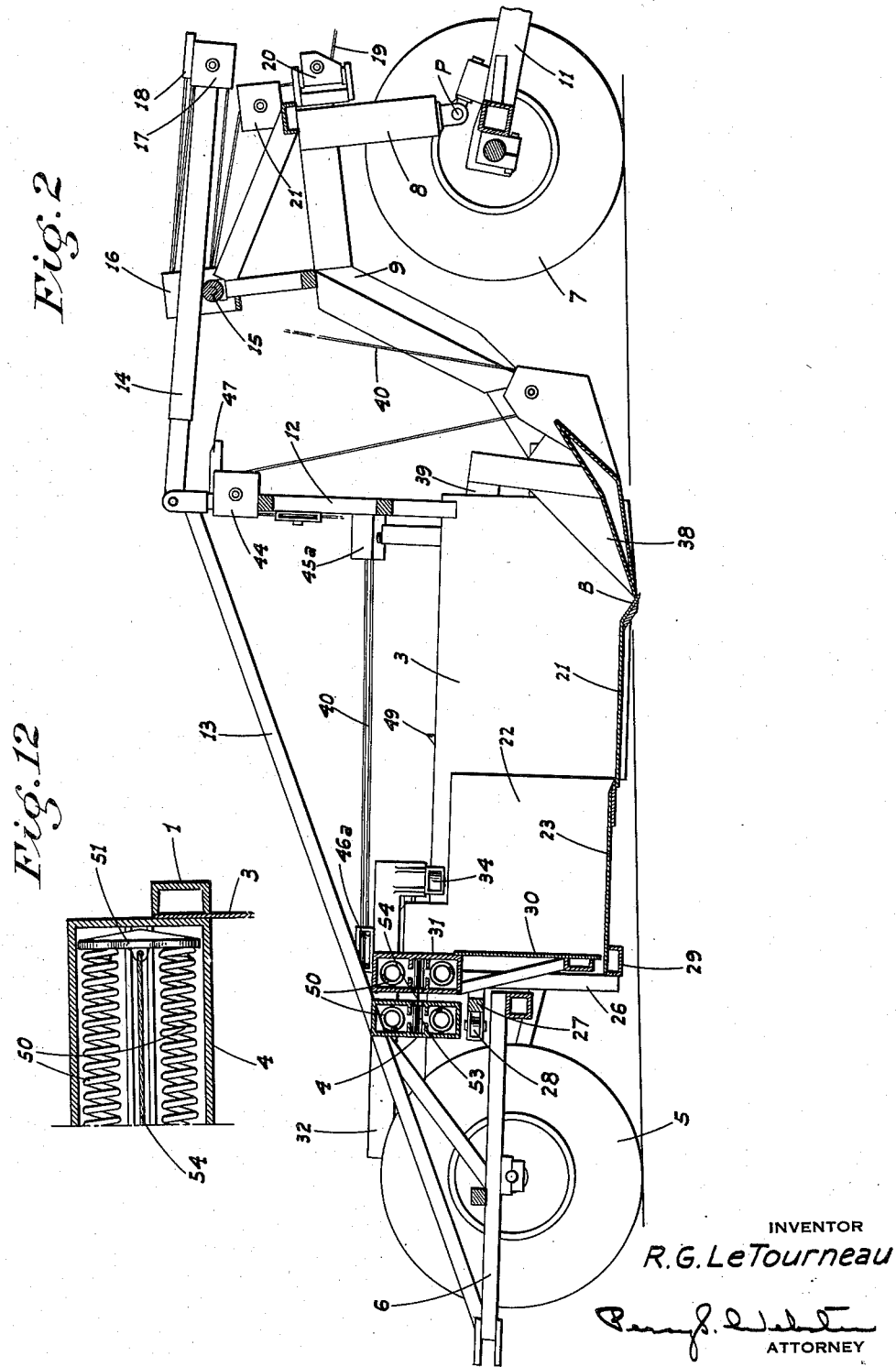

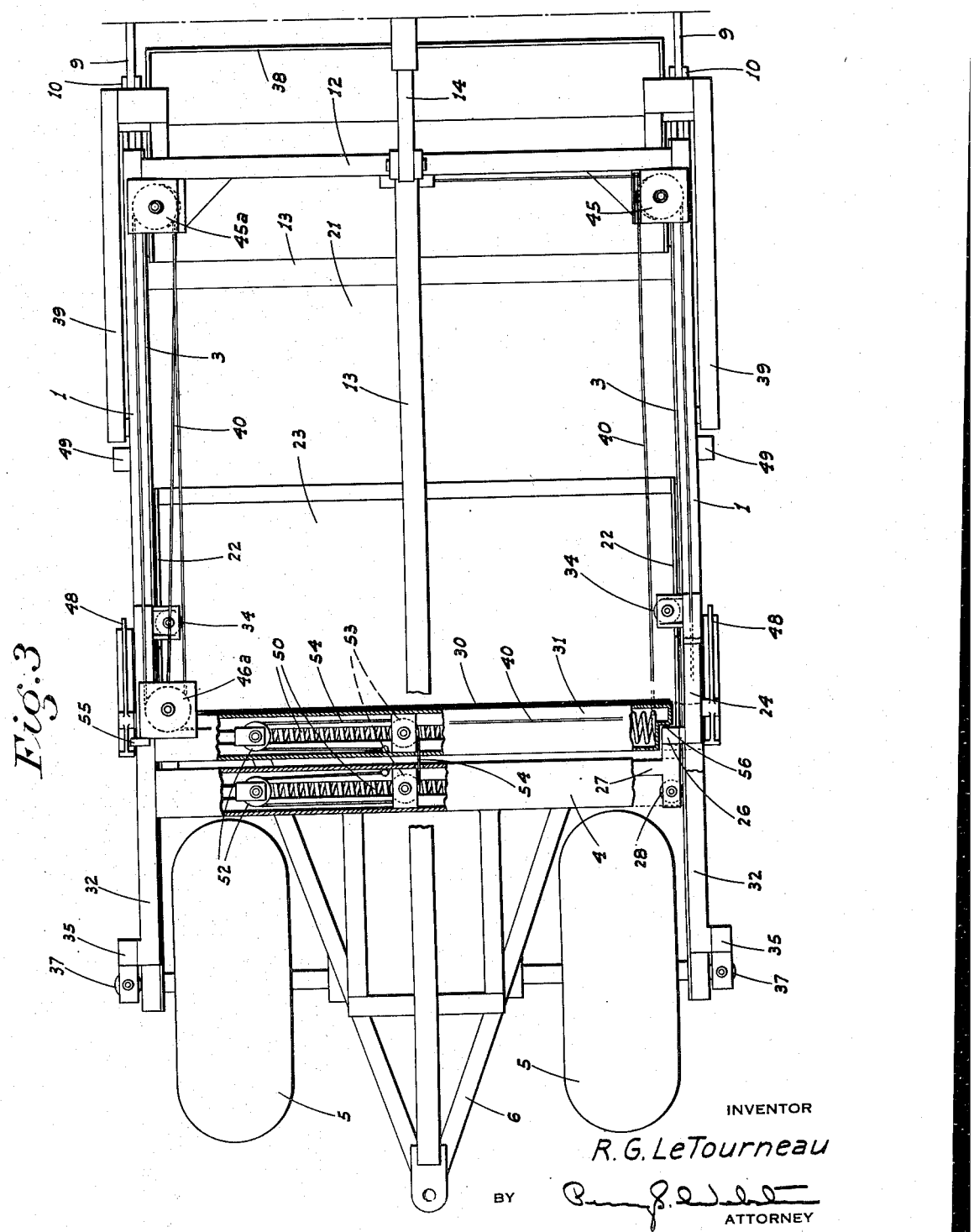

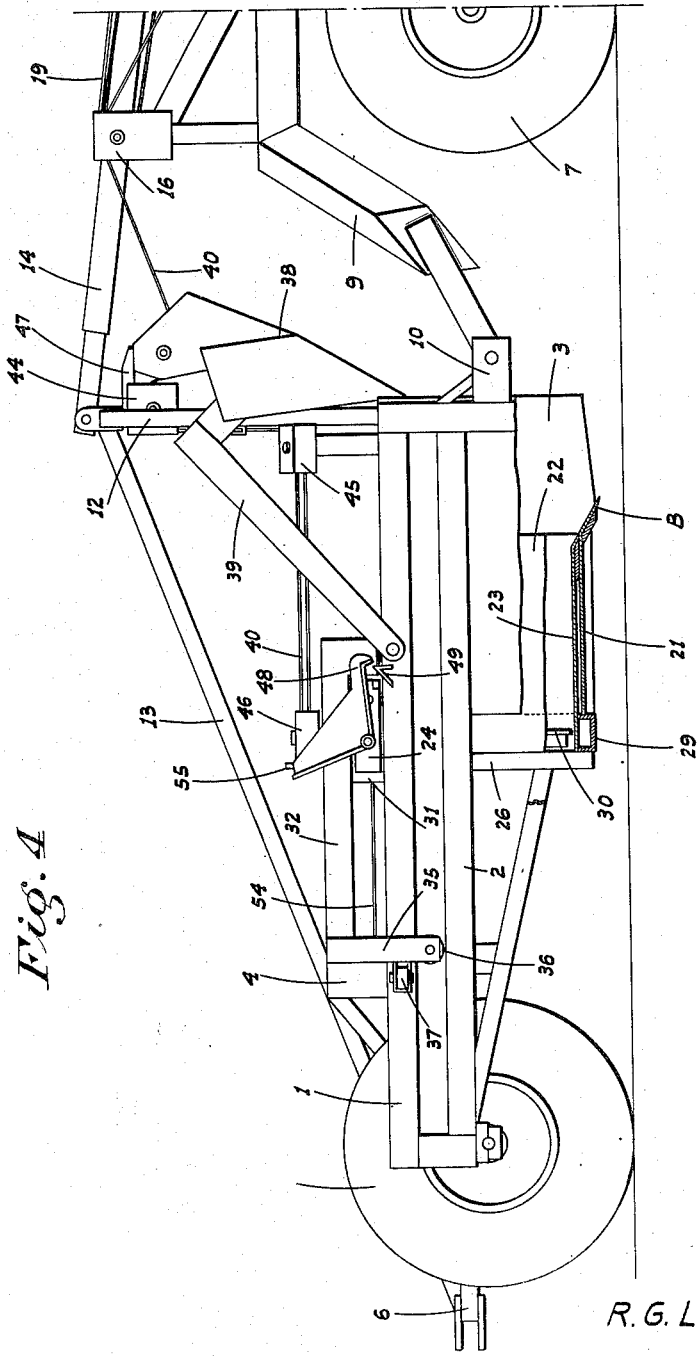

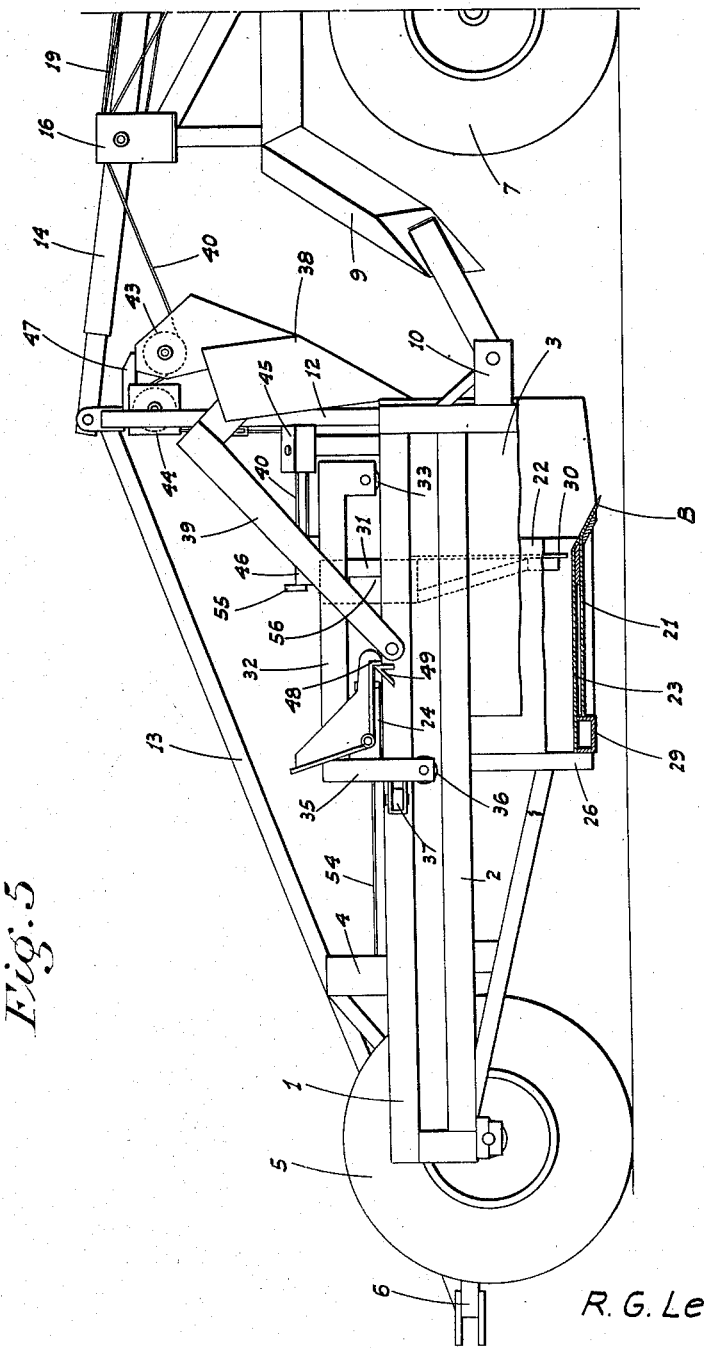

March 22, 1938.   R. G. LE TOURNEAU   2,112,105
TELESCOPING SCRAPER
Filed Nov. 10, 1936   6 Sheets-Sheet 6
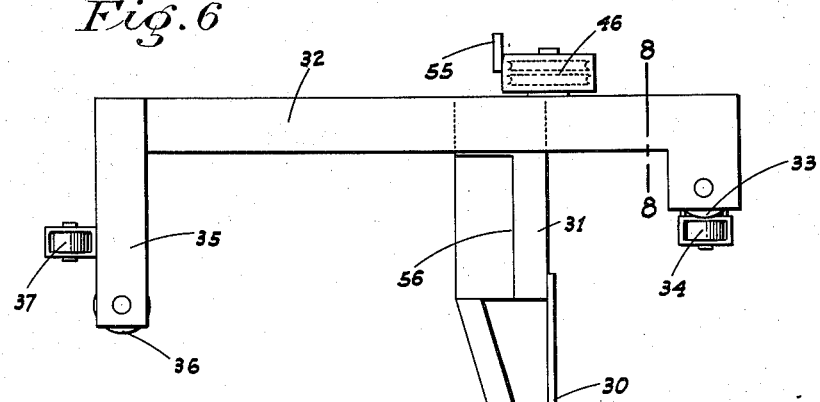
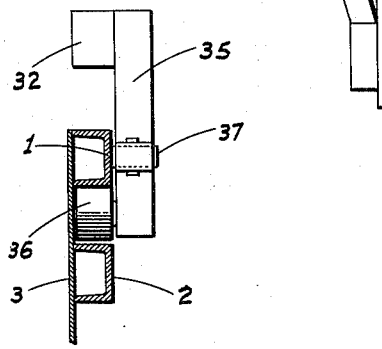
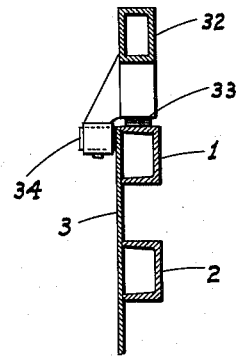
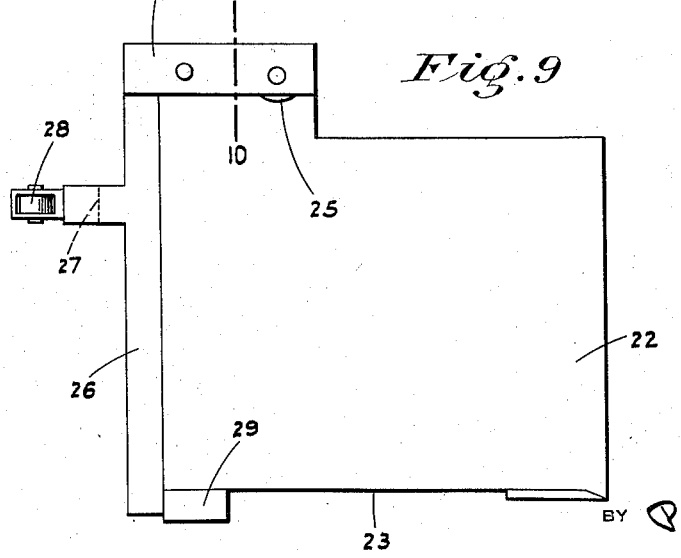
INVENTOR
R.G.LeTourneau
BY
ATTORNEY Patented Mar. 22, 1938

2,112,105

UNITED STATES PATENT OFFICE 2,112,105

TELESCOPING SCRAPER

Robert G. Le Tourneau, Peoria, Ill., assignor to R. G. Le Tourneau, Inc., Stockton, Calif., a corporation of California Application November 10, 1936, Serial No. 110,078

11 Claims. (Cl. 37—126)

This invention relates to tractor-drawn scrapers of large capacity; the objects of the present invention being to provide a scraper of this general character provided with a relatively stationary bowl and a movable bowl telescopically mounted in connection therewith, a front apron to close the main bowl, a tailgate forwardly movable to discharge the bowl and a single control means to control the raising of the apron and the forward movement of the tailgate and telescoping bowl; said means functioning automatically to first raise the apron and then advance the tailgate in a load discharging direction.

A further object is to provide what I believe to be a novel spring arrangement to retract the tailgate which is very compact and takes up practically no room lengthwise of the scraper; but is in this respect an improvement over the spring return device shown in my Patent Number 1,963,665, dated June 19, 1934.

A further object is to provide a novel structure and control means for raising and lowering the scraper to transporting and digging positions respectively.

These objects I accomplish by means of such structure and relative arrangement of parts as will fully appear by a perusal of the following specification and claims.

In the drawings similar characters of reference indicate corresponding parts in the several views:

Figure 2 is a sectional elevation of the scraper in a scraping position.

Figure 3 is a fragmentary top plan of the scraper partly in section.

Figure 4 is a fragmentary side view partly in section showing the apron raised and the bowls telescoped but with the tailgate still relatively retracted.

Figure 5 is a similar view showing the tailgate advanced to a full discharging position.

Figure 6 is a side view of the tailgate detached.

Figure 7 is a fragmentary rear end view of the tailgate frame, also shown in connection with the adjacent portion of the main bowl and its frame.

Figure 8 is a fragmentary cross section on the line 8—8 of Fig. 6, shown in connection with the adjacent portion of the main bowl and frame.

Figure 9 is a side elevation of the telescoping or rear bowl detached.

Figure 10 is a fragmentary cross section on the line 10—10 of Fig. 9 shown in connection with the main bowl.

Figure 12 is a fragmentary vertical section of one of the spring boxes.

Figures 1, 11:
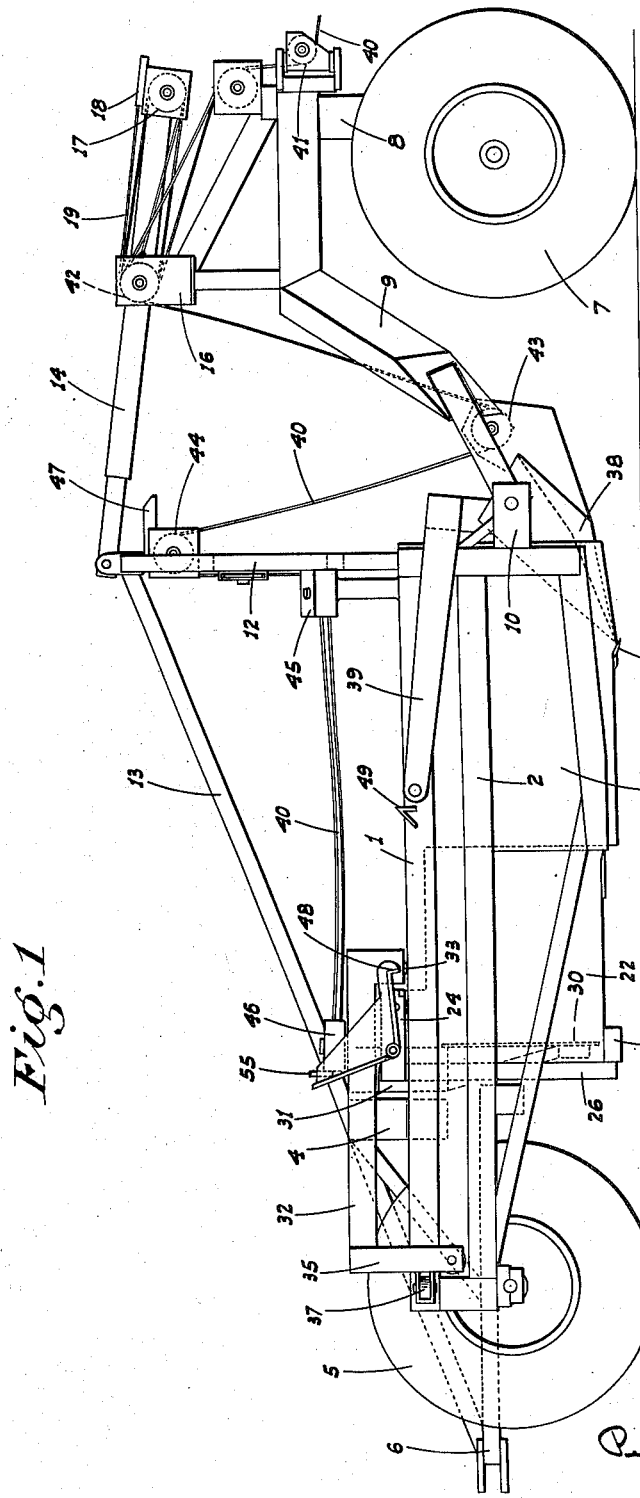
Figure 1 is a side elevation of the scraper in a transporting position.
Figure 11 is a fragmentary top plan view of the pusher bar showing the sheave and cable connections.

Referring now more particularly to the characters of reference on the drawings, 1 and 2 denote upper and lower parallel side beams, secured against side plates 3 the forward portions of which depend from the beams and from the sides of the front or stationary bowl. These beams and plates form the body of the scraper and constitute a rigid frame and bowl unit.

A hollow transverse beam 4 constituting a spring box as will be hereinafter seen, connects the beams 1 and 2 toward their rear end and projects above the same some distance. Rearwardly of the box wheels 5 are disposed inwardly of said beams, being journaled in connection with the lower beams 2 and with an auxiliary frame structure 6 disposed between the wheels and which forms a rigid part of the body unit.

At the front end of the scraper is a swivel wheel truck 7. An upstanding post 8 is pivoted at its lower end as at P on the truck, from the top of which post arms 9 project rearwardly and then downwardly in diverging relationship. At their lower rear ends these arms are pivotally connected with ears 10 projecting forwardly from the side plates 3 just below the beams 2. The truck is provided with a tongue 11 adapted for connection to the drawbar of a tractor.

An auxiliary frame structure 12 projects upwardly from the body of the scraper at its forward end; a compression bar 13 extending centrally from the top of this frame to the auxiliary frame 6 rearwardly of the axles of the wheels 5. A centrally disposed substantially horizontal pusher bar 14 is pivoted on the upper end of the frame 12 in longitudinal alinement with the bar 13 and extends forwardly over the front wheel truck, being supported intermediate its ends on a roller 15 (see Fig. 2). This roller is disposed between and is mounted in connection with transversely spaced sheave blocks 16 which are rigidly mounted in connection with the arms 9 above and at the forward end of the same. Transversely spaced sheave blocks 17 alined with the blocks 16 are fixed on the front end of the bar 14, with a horizontal pulley 18 also fixed on said bar across the blocks 17.

A cable 19 extends from a power unit on the tractor through a fairlead 20 on the front of the post 8, over a pulley 21 on the top of the post, then to and between the pulleys of the sheave blocks 16 in the order named on one side of the bar 14. The cable then passes about the pulley 18 to and between the pulleys of the sheaves 16 and 17 on the opposite side of the bar to a final anchor on one of said blocks. A pull on the cable therefore moves the pusher bar rearwardly relative to the blocks 16 and to the frame on which said blocks are mounted. This imparts a downward pressure and movement to the auxiliary frame rearwardly of the rear wheel axles, causing the scraper body to be tilted upwardly at its front end, turning, of course, on the rear wheels as an axis. This upward movement of the scraper body is, of course, aided by the simultaneous upward pull of the arms 9 caused by the relatively forward movement of the sheave blocks 16; said arms turning about the pivotal connection P of the post 8 as an axis. When the cable is slacked the weight of the body causes the same to drop of itself, the level of scraping or transporting being thus controlled by the tension of the cable 19.

The main or relatively stationary bowl, of which the forward portions of the side plates 3 form a part, includes a bottom plate 21 parallel to the beams 1 and 2 and a scraper plate B disposed some distance rearwardly of the forward end of the plates 3. The telescoping or back bowl includes side plates 22 disposed just inwardly of the plates 3 and a bottom plate 23 parallel to and just above the plate 21 and substantially the same length. The forward edge of said plate 23 just overlaps the rear end of the plate 21 when the back bowl is in its fully retracted position. Neither bowl is provided with any back plate formed as an actual part thereof.

The side plates 22 are provided at the top with longitudinal beams 24 which overhang the beams 1 and carry rollers 25 riding on said beams. The plates are reinforced at the back by vertical beams 26 which are connected intermediate their ends by a cross beam 27. At the ends of this cross beam are rollers 28 which engage the inner faces of the side plates 3 preferably in a horizontal plane intermediate the beams 1 and 2. Another cross beam 29 extends under the plates 23 at the back, just in front of the beams 26.

The back plate for the scraper bowls is formed as a forwardly movable tailgate. This comprises a vertical gate plate 30 normally disposed just inside the back bowl at the rear and depending from and connected to a transverse hollow beam 31 forming a spring box which is disposed parallel to and horizontally alined with the spring box 4 ahead of the same. The box 31 is connected at its ends and top by longitudinal beams 32 which overhang the beams 1 as well as the beams 24. At their forward end the bears 32 are provided with rollers 33 which ride on the beams 1 and with other rollers 34 which engage the inner faces of the plates 3 adjacent the top; the side plates 22 of the back bowl being cut away to expose said plates 3 for engagement by these rollers.

At the rear end of the beams 32 are depending posts 35 which extend down past the beams 1 on the outside and carry rollers 36 engaging the underside of said beams, and other rollers 37 engaging said beams on the outside. The tailgate is thus supported for easy movement and is held against tipping or lateral deflection.

The front end of the main bowl is provided with an apron 38 fitting inside said bowl and mounted on rearwardly projecting side arms 39 pivoted on the beams 1. In the operation of the scraper, when it is desired to discharge a load the apron is raised first, the tailgate and back bowl then advanced as a unit to the limit of movement of the latter and the tailgate is then advanced by itself to the front of the back bowl. These movements are accomplished in the order named by the following means:

Cable 40 extends from the tractor over a fairlead 41 then over a pulley 42 provided with one of the sheave blocks 16 (see Fig. 11), down to and about a pulley 43 mounted on the apron in front and centrally of the same, and then over a pulley 44 mounted on the auxiliary frame 12. The cable then extends to a sheave block 45 mounted at the base of the frame 12 at one side of the scraper and then to another sheave block 46 mounted on the top of the spring box 31 at the adjacent end. After passing back and forth between the pulleys of said blocks the cable extends transversely to a similar sheave block 46a on the opposite ends of the box 31 and then to another sheave block 45a disposed at the base of the auxiliary frame 12 on the side thereof opposite the block 45. The cable then passes back and forth between the pulleys of the last named blocks to a final anchorage on one of them.

It will thus be seen that when the cable is pulled the apron 38, being directly connected to the cable and offering the least resistance is lifted first, its upward movement being limited by the engagement of the housing of pulley 43 with a stop finger 47 projecting from the frame 12 adjacent the pulley 44. When thus raised, the apron is well clear of the bowl as will be seen from Figs. 4 and 5. The cable then acts on the tailgate to advance the same. Due to the weight and resistance of the dirt in contact with the bottom of the back bowl (which dirt being naturally deeper in said back bowl than in the front bowl has a greater resistance than the dirt in the latter) said back bowl advances as a unit with the tailgate as shown in Fig. 4 causing the load in the main front bowl to be discharged. As the back bowl reaches its forward limit of travel, as determined by the engagement of the cross beam 29 with the rear end of the main bowl, latches 48 pivoted on the side beams 24 of the back bowl, drop over catch lugs 49 mounted on the beams 1. The tailgate then advances to the forward end of the back bowl as shown in Fig. 5 completing the discharging of the load.

When the cable 40 is allowed to run slack the tailgate first moves back to the rear of the back bowl and then picks up and retracts the said back bowl, the apron, of course, also dropping to a position determined by the tension of the cable 40. It may here be noted that, when loading the scraper, the back bowl is preferably maintained in its advanced position, but with the tailgate of course retracted, until said back bowl is loaded. Said bowl is then allowed to move back to its normal position so as to clear the front bowl and permit of the loading of the latter.

The return or retracting movement of the tailgate and back bowl are accomplished by the following means:

The spring boxes 4 and 31 each contains a pair of vertically spaced compression springs 50. These extend lengthwise of the boxes and at one end bear against one end of the boxes. At their opposite end the springs in each box are engaged by a connecting member 51 (see Fig. 12) to each of which between the springs is attached a horizontal pulley 52 (see Fig. 3). Centrally of the length of the boxes, fixed horizontal pulleys 53 are mounted between the springs. A cable 54 anchored at one end in one box adjacent the corresponding pulley 53 extends thence over the adjacent pulley 52, back over said pulley 53 and into the other box. The cable there passes about the adjacent pulley 53 and to and about the corresponding pulley 52 to an anchorage in said box.

When the tailgate is fully retracted, the springs are considerably extended though not slack, thus maintaining the cable under tension. As the tailgate is advanced, the springs are placed under increasing compression so that they are able to exert sufficient pressure to return the tailgate and back bowl to their normal position. This arrangement of the springs thus provides, in a very compact manner, sufficient power to retract the tailgate and bowl even though the movement of the latter is considerable, and without adding anything to the length of the scraper.

With the retracting movement of the parts from a fully advanced position, the tailgate moves back lengthwise of the back bowl without the latter moving, since it is held against retractive movement by the latches 48. As the tailgate reaches the limit of rearward movement relative to the back bowl, lugs 55, mounted in connection with the tailgate (on the spring box 31), engage and lift the latches 48 from the lugs 49. The continuing action of the springs 50 can thus draw the back bowl and tailgate back as a unit. These parts thus move together for the reason that the side posts 26 of the back bowl are then engaged by the spring box 31 of the tailgate; the lower portion of said box at its ends being recessed as at 56 to receive the upper portion of said posts when these parts are in their normal relation to each other (see Figs. 3 and 6).

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper comprising a front relatively stationary bowl, a back bowl normally projecting rearwardly from the front bowl and mounted for advancing movement into the same, a tailgate normally disposed at the rear end of the back bowl for advancing movement into the same, means to advance the tailgate, said back bowl, when loaded, advancing as a unit with the tailgate and without relative movement therebetween until the back bowl has moved substantially its full length into the front bowl, means to stop further movement of the back bowl whereby the tailgate may then advance in said back bowl with continued manipulation of the advancing means, means to retract the tailgate, means on the tailgate to engage and exert a retractive pressure against the back bowl when said tailgate has reached its normal position at the rear end of the back bowl, and means preventing retractive movement of the back bowl from a fully advanced position until the tailgate has reached said rear position.

2. A structure as in claim 1 in which said last named means comprises releasable catch means between the front and back bowls functioning to prevent retractive movement of the back bowl from a fully advanced position, and means on the tailgate to release said catch means as the tailgate reaches its position at the rear of the back bowl.

3. A scraper comprising longitudinal frame beams, a front bowl depending from and rigid with the beams, said bowl including a bottom plate parallel to said beams, a back bowl normally projecting rearwardly from the front bowl and adapted to advance into the same, said back bowl including a bottom plate parallel to the beams, means supporting the back bowl from the beams for movement parallel thereto, a tailgate normally disposed at the rear end of the back bowl for advancing movement into the same, a carriage from which the end gate depends supported on said beams for movement lengthwise thereof, and means to control the movements of the back bowl and tailgate.

4. A scraper comprising a bowl, a tailgate normally disposed at the rear of the bowl and mounted for advancing movement into the same, means to advance the gate, a transverse hollow beam secured on the scraper behind the tailgate and forming a spring box, a helical compression spring extending lengthwise in said box and bearing at one end against one end of the same, a member movable lengthwise in the box engaging the other end of the spring, a pulley mounted on a vertical axis in said box intermediate its ends and clear of the spring, and a cable extending from the tailgate to and about the pulley to an operative connection with said member to pull the same transversely in the direction of the pulley and compress the spring with the advancing movement of the tailgate away from the beam.

5. A scraper comprising a bowl, a tailgate normally disposed at the rear of the bowl and mounted for advancing movement into the same, means to advance the gate, a transverse hollow beam mounted with the tailgate and forming a spring box, a pair of spaced parallel compression springs extending lengthwise in said box and bearing at one end against one end of the same, a member movable lengthwise in the box extending over and engaging the opposite end of the springs, a pulley mounted in connection with said member between the springs, another pulley mounted in the box in a plane between the springs intermediate the ends of the box, and a cable anchored in connection with the scraper behind the tailgate extending forwardly over the last named pulley to and about said first named pulley to an anchorage in the box intermediate the ends thereof.

6. A scraper comprising a bowl, a tailgate normally disposed at the rear of the bowl and mounted for advancing movement into the same, means to advance the gate, a transverse hollow beam mounted with the tailgate and forming a spring box, a similar box forming beam mounted on the scraper behind the first box, a pair of vertically spaced compression springs in each box bearing at one end against one end of the box, members movable lengthwise in the boxes extending over and engaging the opposite ends of the corresponding springs, a pulley mounted in connection with each member between the springs, pulleys mounted in the boxes in facing relation in a plane between the springs and substantially central of the length of the boxes, and a cable anchored at one end in the tailgate box intermediate the ends and on the front face thereof, and extending thence over the adjacent member pulley, to and over the adjacent box pulley and across to the rear box pulley, then to and over the corresponding member pulley to an anchorage in the scraper box at the back and intermediate the ends thereof.

7. A scraper comprising a frame structure, a front bowl rigid therewith, a back bowl normally projecting rearwardly from the front bowl, means supporting the back bowl from the structure for advancing movement into the front bowl, a tailgate normally forming a closure for the rear end of the back bowl, means separate from the back bowl supporting means supporting the tailgate from the structure for advancing movement into the back bowl, and means to control the movements of the back bowl and tailgate.

8. A scraper including longitudinal side frame beams, a front bowl rigid with said beams, a back bowl normally projecting rearwardly from the front bowl and disposed between the beams, supporting elements on the back bowl overhanging and movably riding on the beams, a tailgate normally forming a closure for the rear end of the back bowl and adapted for advancing movement into the same, and a carriage supporting the tailgate from the frame beams and including longitudinal members overhanging the beams above and clear of the beam engaging elements of the back bowl, and elements fixed with said members at the ends thereof and riding on the beams.

9. A structure as in claim 8, in which said carriage elements are spaced apart lengthwise of the beams to allow of the unrestricted movement of the back bowl supporting elements for the full travel of the back bowl.

10. A scraper comprising a frame structure, a front bowl rigid therewith, a back bowl normally projecting rearwardly from the front bowl, means supporting the back bowl from the structure for advancing movement into the front bowl, means to advance the back bowl, catch means between said back bowl and the frame structure to hold the bowl against retractive movement from an advanced position and including a releasable catch member on the back bowl, a tailgate normally forming a closure for the rear end of the back bowl and mounted for advancing movement into the same, means to retract the tailgate from an advanced position, and an element on the tailgate positioned to engage and release the catch member when the tailgate reaches a fully retracted position whereby to then allow of retracting movement of the back bowl.

11. A scraper comprising a frame, a bowl mounted in the frame, a tailgate normally disposed at the rear end of the bowl and mounted for advancing movement into the same, a hollow transverse beam rigid with the tailgate to brace the same and also forming a spring box, a compressible spring within the box, means to advance the tailgate, and means to compress the spring and cause the same to exert a retractive action on the tailgate as the latter is advanced.

ROBERT G. LE TOURNEAU.